United States Patent
Todd et al.

(10) Patent No.: US 6,212,036 B1
(45) Date of Patent: Apr. 3, 2001

(54) MECHANICALLY ACTUATED TAPE HEAD CLEANER HAVING DEBRIS REMOVAL VACUUM

(75) Inventors: Christian Allen Todd, Thornton; Philip J. Burke, Superior, both of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/363,536

(22) Filed: Jul. 29, 1999

(51) Int. Cl.[7] .................................................. G11B 5/41
(52) U.S. Cl. ................................... 360/128; 360/132
(58) Field of Search ....................................... 360/128, 132

(56) References Cited

U.S. PATENT DOCUMENTS

| | | | | |
|---|---|---|---|---|
| 4,905,112 | * | 2/1990 | Rhodes | 360/132 |
| 5,109,313 | * | 4/1992 | D'Alayer De Costemore D'Arc | 360/128 |
| 5,309,307 | * | 5/1994 | Fritsch et al. | 360/128 |

* cited by examiner

Primary Examiner—Jefferson Evans
(74) Attorney, Agent, or Firm—Brooks & Kushman P.C.

(57) ABSTRACT

A cartridge for cleaning read/write heads and associated tape path in a magnetic tape system includes a brush arranged to loosen debris, and an impeller driven by a tape drive mechanism to create a vacuum within the cartridge housing to facilitate capture of the loosened debris within a removable filter. In one embodiment, the brush is attached to a wiper arm driven by either the same or a second tape drive mechanism in the tape system. The wiper arm can be driven in a direction orthogonal to the direction of tape movement to allow efficient cleaning of magnetic heads having bleed slots or gutters which extend orthogonal to the tape path. In addition, the wiper arm can be made of electrically conductive material, and the cartridge can include a conductive base plate arranged to provide a ground path between the brush and a ground potential in the tape system, thereby safely dissipating any buildup of static electricity. Alternatively, the brush can be stationary mounted for use with tape systems capable of moving the head orthogonal relative to the tape path.

19 Claims, 5 Drawing Sheets

MECHANICALLY ACTUATED TAPE HEAD CLEANER HAVING DEBRIS REMOVAL VACUUM

TECHNICAL FIELD

The present invention relates generally to magnetic tape head cleaning arrangements, and more specifically to a cleaning cartridge suitable for use with tape systems having high density read/write head arrangements.

BACKGROUND ART

Generally, a problem common to all types of magnetic tape systems is that, over a period of time and use, the magnetic heads and associated tape drive components within the system for writing to and reading signals from the magnetic tape media become covered with contaminants. One source of such contaminants derives from the tape material itself, which is typically formed from a substrate having multiple types of coatings applied thereto, all of which tend to decay during operation and storage of the tape. As a result, debris forms and accumulates on the head and other drive components. Because this accumulation can compromise the ability of the tape system to properly read to and write from the tape, routine cleaning of the tape system is required.

The accumulation of debris is particularly problematic in high density multi-track tape systems. More specifically, known high density multi-track magnetic tape systems employ magnetic read/write heads having slots or gutters formed therein to ensure a proper interface for reading and writing information to the tape. In conventional head arrangements, these gutters are positioned between respective read and write elements and oriented parallel to the direction of tape movement across the head. In order to maintain proper tape contact with the read and write elements during operation of the system, the gutters must be free from any debris. Since the orientation of the gutters is parallel to the direction of tape travel, one type of conventional tape cleaning cartridge has been developed which uses a cleaning media spooled onto a standard cartridge and run across the read/write head to clean accumulated debris and other contaminants from the gutters. This type of conventional cleaning cartridge device and variations thereof operate using a linear wiping motion in the same direction as tape travel.

However, such a cleaning arrangement has not proven wholly satisfactory. More specifically, such cleaning cartridges are capable of holding only a limited length of cleaning media, and therefore can be used only a small number of times before a new cleaning cartridge is required. In addition, such cleaning cartridge arrangements typically are not capable of removing debris from other tape drive mechanisms which operate to transport the tape across the head of the tape system, nor eliminate the potential for static discharge which can potentially damage electronic circuit components located in the tape system.

Further compounding the problem of debris removal in multi-track recording devices is that newer high density linear tape systems locate the respective read and write elements much closer together on the head. Such close placement prohibits positioning of gutters between the elements. As a result, the gutters are reoriented to extend in an orthogonal direction relative to the direction of tape motion. While such an orthogonal gutter orientation achieves the desired read/write interface, the orientation also allows debris to more readily accumulate. In addition, the orthogonal orientation does not lend itself well to cleaning by the aforementioned conventional wiping cartridge cleaning arrangements.

An additional problem with existing head cleaners is the disposition of debris removed from the tape head. Removed debris may remain on the cleaning brush or pad, reducing effectiveness. The debris may also settle back into tape head groves or fall onto tape system components.

Alternative head cleaning approaches have attempted to clean the gutters using a single or dual brush mechanism arranged to be swept across the head orthogonal to the direction of tape movement. While such arrangements may provide improved performance over spooled cleaning cartridges, the brush mechanisms only operate to push debris along a gutter without actually insuring removal from the gutter or tape path. As a consequence, a need still exists for a head cleaning arrangement capable of efficiently cleaning gutters oriented orthogonal to the direction of tape while eliminating the inadequacies of known head cleaning arrangements.

DISCLOSURE OF INVENTION

It is therefore an object of the present invention to provide a cleaning device having improved efficiency in removing contaminants and other debris from a read/write head and drive mechanism of a magnetic tape system.

It is another object of the present invention to provide a cleaning cartridge which can efficiently clean and remove contaminants and other debris from a magnetic tape system having a read/write head arranged with gutters or bleed slots extending orthogonal to the direction of tape movement.

It is still another object of the present invention to provide a cleaning device for cleaning debris and other contaminants from a read/write head and drive mechanism of a magnetic tape system which is capable of removing and discharging the debris from the tape system.

It is yet another object of the present invention to provide a cleaning cartridge for cleaning debris and other contaminants from a read/write head and drive mechanism of a magnetic tape system which is capable of removing and capturing the debris within the cleaning cartridge.

In accordance with these and other objects, the present invention provides a cartridge for removing contaminants from a read/write head of a magnetic tape system which includes a housing, a gear positioned within the housing so as to engage a tape drive mechanism when the cartridge is inserted into the tape system, and a cleaning element mounted to the housing and arranged to loosen any contaminants from the read/write head. A first impeller is mounted within the housing and arranged to be rotated when the gear is driven by the tape drive mechanism. Rotation of the impeller creates an air flow that draws loosened contaminants into the housing.

In further accordance with the present invention, a filter can be positioned within the air flow created by the impeller to capture and store the loosened contaminants drawn into the housing. In accordance with one embodiment, an opening is formed in the housing and positioned relative to the impeller to provide an output port for the air flow created by the impeller. The filter can be positioned within the air flow at the output port. In accordance with another embodiment, a cavity is formed within the housing having openings positioned to allow the air flow created by the impeller to pass through the cavity. The filter could also be positioned within the cavity.

The cleaning element can be formed from a wiper arm mounted to the housing and arranged to be driven by the tape drive mechanism. A brush is mounted to the wiper arm. In one embodiment, one end of the wiper arm is pivotally mounted to the housing to allow the brush to be moved in a direction orthogonal to a direction of tape movement across the head. In accordance with yet another embodiment, the tape system can include two separate tape drive mechanisms, one driving the wiper arm and driving the impeller gear. The wiper arm can be driven by a drive gear and drive pin arrangement, or a cam and drive pin arrangement. In still another embodiment where the read/write head is moveable relative to the cartridge, the cleaning element is kept stationary. In addition, the cleaning element of the present invention can be formed from an electrically conductive material, and connected to a tape system ground potential to safely dissipate static electrical charge. In accordance with still another embodiment, a magnetic element is positioned within the housing to attract loosened contaminants for collection with the housing.

In accordance with another aspect of the present invention, a method is provided for cleaning a read/write head in a tape system which includes contacting the read/write head with a cleaning element to loosen any contaminant deposits, and coupling at least one tape drive mechanism in the tape system to a rotatable impeller located within a cleaning cartridge housing to create an air flow to draw loosened contaminants through an opening for storage in the housing.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
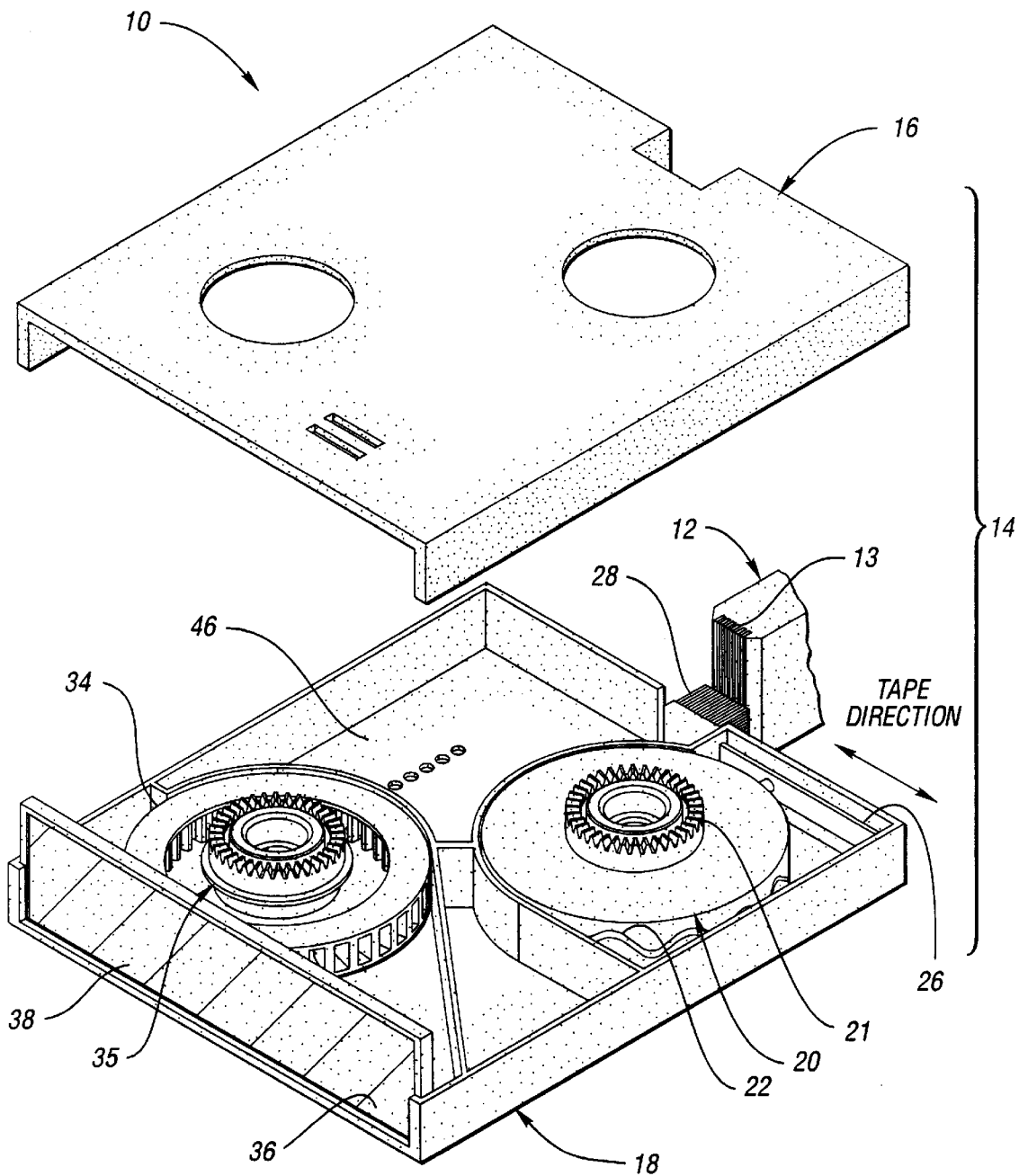
FIG. 1 is a perspective view as seen from a filter end of a cleaning cartridge in accordance with a first embodiment of the present invention for use with a tape system having two separate tape drive mechanisms.
Figure 2:
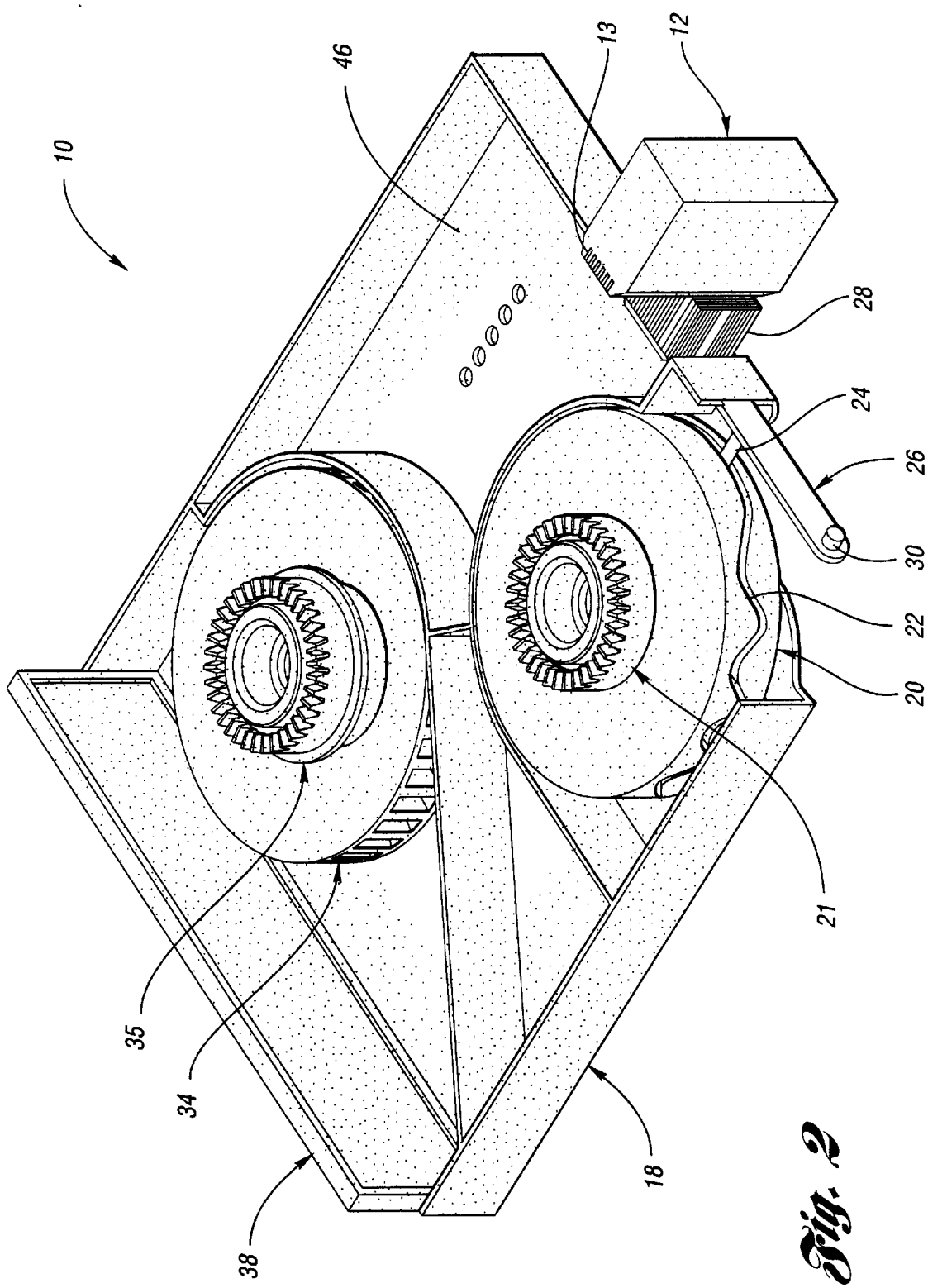
FIG. 2 is a perspective view of the cleaning cartridge of FIG. 1 as seen from a brush end.
Figure 3:
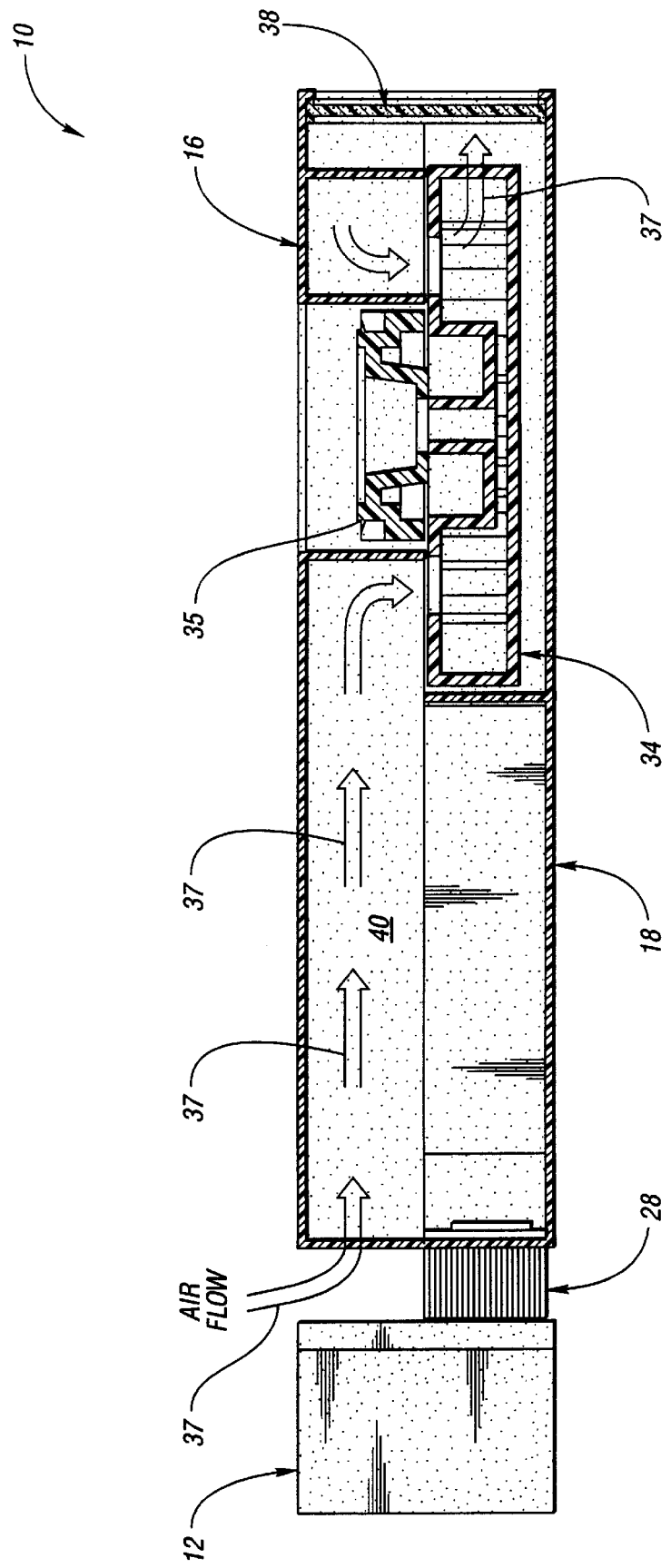
FIG. 3 is a side cross-sectional view of the cleaning cartridge of FIG. 1.

Referring to FIGS. 1–3, a magnetic tape cleaning cartridge 10 is shown in accordance with a first embodiment of the present invention. In this embodiment, cartridge 10 is arranged to operate in conjunction with a tape system having two separate spool drive motors. The tape system would generally include a tape deck having a loader mechanism (not shown) which is arranged to accept tape cartridges for recording and playback as is well understood by one of ordinary skill in the art. The loader mechanism is arranged to allow cartridge 10 to come into contact with a magnetic read/write head 12 and other tape drive element(s) of the tape deck requiring cleaning. In the preferred embodiment, read/write head is a high density multi-track head having a plurality of bleed slots or gutters 13 oriented in an orthogonal direction relative to the direction of the tape path as indicated by the single line arrow in FIG. 1.

Cartridge 10 includes a housing 14 formed from two half shells 16 and 18 fastened together upon assembly such as with a threaded fastener (not shown). While FIG. 2 does not show top half 16, it is to be understood that all embodiments include a similar mating shell. In a preferred embodiment, housing 14 is dimensioned and configured as an industry standard 3480 tape cartridge. However, such a configuration is not to be construed as limiting.

Within shell 18, cam 20 is positioned in place of a conventional tape cartridge spool, and includes any suitable gear arrangement 21 which will engage a tape drive gear from the tape deck when cartridge 10 is inserted into the loader. As best seen in FIG. 2, cam 20 includes a cam surface, such as a serpentine surface 22, which interacts with one end of a drive pin 24 to continually cause a wiper arm 26 to move up and down, normal to the tape direction, as cam 20 is rotated. The wiper arm includes a cleaning element such as brush 28 attached or integrally formed therewith. In this embodiment, wiper arm 26 is attached to shell 18 via pivot pin 30 at an end opposite brush 28.

An opening is formed in housing 14 so as to oppose read/write head 12 when cartridge 10 is inserted into the loader. Wiper arm 26 is positioned relative to the opening so that brush 28 makes contact with head 12. Thus, as the spool drive motor in the tape deck drives geared cam 20, wiper arm 26 moves brush 28 up and down over the face of read/write head 12 along the direction of slots 13. As this occurs, the deposits of debris or other contaminants are broken loose and removed from slots 13.

In further accordance with the present invention, impeller 34 is positioned in place of the other tape cartridge spool and, as with cam 20, includes any suitable gear arrangement 35 which will engage the other tape gear in the tape deck when cartridge 10 is inserted into the loader. As shown, top shell 16 includes suitable openings which allow the tape decks drive mechanism to move into engagement. Impeller 34 is thus driven by the second motor, and creates an air flow through housing 14 as generally indicated by the double line arrows 37 in FIG. 3. The housing is formed with a second opening 36 at the opposite end from the cleaning brush to provide an output port allowing impeller 34 to operate as a vacuum device to draw the debris loosened by brush 28 into the cleaning cartridge. A removable filter element 38 is either positioned across the output port or placed in a filter compartment 40 formed in the top shell. As best seen in FIG. 3, compartment 40 is provided with suitable air passage openings to allow the air flow to pass through. Filter 38 traps and stores the debris to insure its removal from the tape deck tape drive area.

In further accordance with another aspect of the present invention, cleaning cartridge 10 is adapted to prevent the build-up of static electricity. More specifically, a conductive baseplate, generally denoted as 46, is mounted to housing 14. Baseplate 46 is preferably made of a metal such as aluminum. Baseplate 46 can include at least one protrusion (not shown) arranged to extend through an opening in the shell to make contact with a properly grounded metal or other conductive surface on the loader when cartridge 10 is inserted therein. Wiper arm 26 and brush 28 are also preferably formed from a conductive material. The pivoting mount or fixed mount of wiper arm 26 is arranged to provide a grounding connection with baseplate 46. Baseplate 46 then provides a grounding path to the loader and tape deck, thereby safely dissipating static build-up and preventing damage to electronic components in the tape system. Alternatively, baseplate 46 may be made of a conductive material, such as conductive plastic, and integrated into bottom half shell 18.

Figure 4:
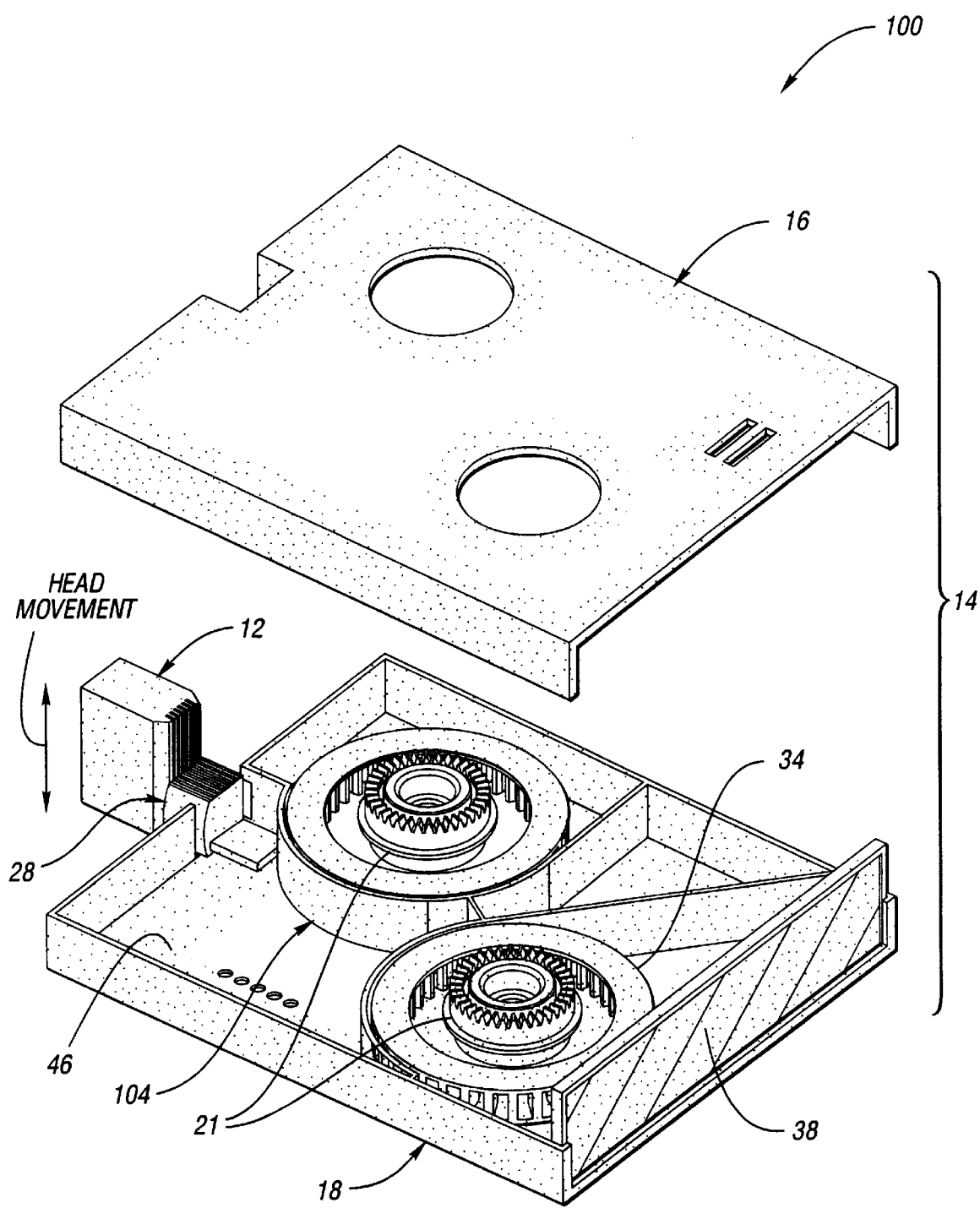
FIG. 4 is a perspective view of a magnetic tape cleaning cartridge in accordance with a second embodiment of the present invention having two impellers and a stationary brush.

Referring now to FIG. 4, cleaning cartridge 100 is shown in accordance with a second embodiment of the present invention. Like elements as those described in connection with cartridge 10 have been designated with the same reference number. In this embodiment, cleaning cartridge 100 has been modified for use with a tape system having a moveable arrangement for read/write head 12. With such a head arrangement, there is no need to mechanically sweep or rotate cleaning element 28 across head 12. As a result, wiper arm 102 is fixedly mounted to housing 14 to prevent movement of cleaning element 28. In addition, since wiper arm 102 does not need to be mechanically driven, second impeller 104 is used in place of drive gear/cam 20 for increased vacuum air flow.

Figure 5:
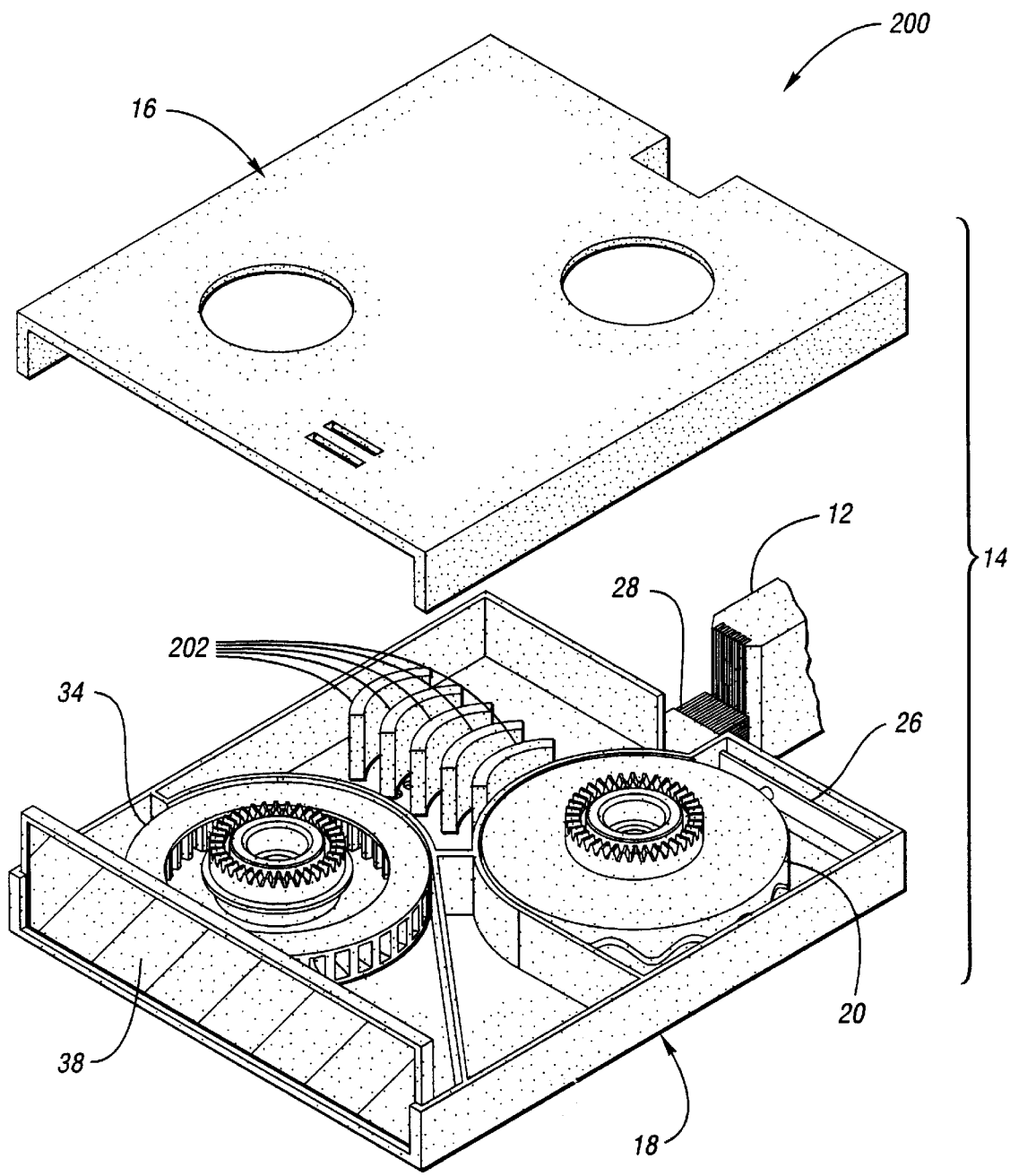
FIG. 5 is a perspective view of a cleaning cartridge in accordance with a third embodiment of the present invention having an internal magnetic arrangement for attracting debris.

FIG. 5 illustrates a cleaning cartridge 200 in accordance with a third embodiment, where like elements as those described in connection with cartridge 10 have been designated with the same reference number. In this embodiment, cartridge 200 has been modified to include at least one magnet 202 positioned between the brush and the impeller. Preferably a set of magnets are used. Alternatively, a set of magnetized screens could be used. The set of magnets or screens are positioned relative to the air flow path created by impeller 34 that metal or other charged debris removed by brush 28 is attracted to and collected on the magnets. The magnets or screens can be periodically accessed by opening the housing for subsequent removal of the collected debris.

In another embodiment of the present invention, filter 38 includes a whistling device. When filter 38 is clean, most of air flow 37 is does not pass through the whistling device and, hence, no whistling sound is emitted. As filter 38 fills with dirt and debris, an increasing amount of air flow 37 is forced through the whistling device. Eventually, the whistling device produces an audible sound indicating that filter 38 needs to be replaced.

Therefore, the present invention provides a cleaning cartridge which is capable of efficiently cleaning heads having transverse slots, while removing the debris from the drive area of the tape deck and trapping it in a removable filter located within the cleaning cartridge.

In addition to the different embodiments described above, other modifications could made with out departing from the scope of the present invention. For example, the cleaning cartridge cam be adapted for use with a tape system having only one tape drive or spool in the cartridge. With such an arrangement, the impeller would be driven by the single spool. The brush could be stationary, or the impeller could be arranged to include a cam surface that would engage a drive pin and allow a pivoting wiper arm to be driven. Further, the wiper arm could be arranged to be driven horizontally or in a rotary motion, and the wiper could be used for wet cleaning the head. Thus, while the best mode for carrying out the invention has been described in detail, those familiar with the art to which this invention relates will recognize various alternative designs and embodiments for practicing the invention as defined by the following claims.

What is claimed is:

1. A cartridge for cleaning a read/write head in a tape system, the tape system having at least one tape drive mechanism, the cartridge comprising:

a housing;

a gear positioned within the housing so as to engage the at least one tape drive mechanism when the cartridge is inserted into the tape system;

a cleaning element mounted to the housing and arranged to loosen any contaminants from the read/write head; and a first impeller mounted within the housing and arranged to be rotated when the gear engages and is driven by the at least one tape drive mechanism, wherein rotation of the impeller creates an air flow within the housing to draw loosened contaminants into the housing.

2. The cartridge of claim 1 further comprising a filter positioned within the air flow created by the impeller for capturing and storing the loosened contaminants drawn into the housing.

3. The cartridge of claim 2 wherein the filter is removable from the housing.

4. The cartridge of claim 2 further comprising an opening in the housing positioned relative to the impeller to provide an output port for the air flow created by the impeller, wherein the filter is positioned within the air flow at the output port.

5. The cartridge of claim 2 wherein the filter comprises a whistling device, the filter forcing air through the whistling device as the filter fills with loosened contaminants.

6. The cartridge of claim 2 further comprising an opening in the housing positioned relative to the impeller to provide an output port for the air flow created by the impeller, wherein the filter is positioned within the air flow at the output port.

7. The cartridge of claim 1 wherein the cleaning element comprises a wiper arm mounted to the housing, and a brush mounted to the wiper arm, wherein the wiper arm includes a linkage to be driven by the at least one tape drive mechanism.

8. The cartridge of claim 7 wherein one end of the wiper arm is pivotally mounted to the housing to allow the brush to be moved in a direction orthogonal to a direction of tape movement across the head.

9. The cartridge of claim 7 wherein the tape system includes two separate tape drive mechanisms, the wiper arm linkage being connected to one of the tape drive mechanisms, and the gear positioned to engage the other tape drive mechanism.

10. The cartridge of claim 9 wherein the wiper arm linkage comprises a drive gear driven by one of the tape drive mechanisms, and a pin coupled to the wiper arm and drive gear to move the brush relative to the head.

11. The cartridge of claim 9 wherein the wiper arm linkage comprises a cam driven by one of the tape drive mechanisms, and a pin coupled to the wiper arm and positioned to be driven by the cam to move the brush relative to the head.

12. The cartridge of claim 1 wherein the cleaning element comprises a stationary brush.

13. The cartridge of claim 1 wherein the cleaning element is formed from an electrically conductive material, and is coupled to a tape system ground potential when the cartridge is inserted into the tape system.

14. The cartridge of claim 1 wherein the tape system includes two separate tape drive mechanisms, and the cartridge further comprises a second impeller mounted within the housing between the cleaning element and the other impeller, wherein the second impeller is arranged to be driven by the tape drive mechanism not driving the other impeller, and the air flow is created by rotation of both impellers.

15. The cartridge of claim 1 further comprising at least one magnetic element positioned within the housing so as to attract the loosened contaminants for collection within the housing.

16. A method for cleaning a read/write head in a tape system, the tape system having at least one tape drive mechanism, the method comprising:

contacting the read/write head with a cleaning element to loosen any contaminant deposits; and coupling the at least one tape drive mechanism to a rotatable impeller located within a cleaning cartridge housing to create an air flow to draw loosened contaminants through an opening into the housing.

17. The method of claim 16 wherein contacting the read/write head further comprises moving the cleaning element across the head.

18. The method of claim 17 further comprising moving the cleaning element across the read/write head in a direction orthogonal to a direction of tape movement across the head.

19. The method of claim 17 further comprising driving the cleaning element and the impeller with separate tape drive elements.

* * * * *